No. 746,876. Patented December 15, 1903.

UNITED STATES PATENT OFFICE.

JAMES HUGH PAUL, OF CHARLTON, ENGLAND.

PROCESS OF MAKING HYDROCYANIC ACID AND CYANID SALT THEREFROM.

SPECIFICATION forming part of Letters Patent No. 746,876, dated December 15, 1903.

Application filed February 24, 1903. Serial No. 144,910. (No specimens.)

*To all whom it may concern:*

Be it known that I, JAMES HUGH PAUL, a subject of the King of Great Britain and Ireland, residing at Riverside, Charlton, in the county of Kent, England, have invented new and useful Improvements in the Manufacture of Hydrocyanic Acid and of Cyanid Salts Therefrom, of which the following is a specification.

According to one mode of producing cyanid of potassium or cyanid of sodium, a solution of caustic potash or of caustic soda is treated with hydrocyanic acid obtained from sulfocyanid of soda or ferrocyanid of potassium. The solution is then evaporated and concentrated *in vacuo* and the cyanid of potassium or of sodium obtained in a solid state. When working with sulfocyanid of soda, nitric acid is required, the process of manufacture is tedious and expensive and the yield is unsatisfactory. When working with ferrocyanid of potassium, only about half the available cyanogen is yielded, (as prussic acid,) the other half remaining as an insoluble double ferrocyanid of potassium and iron. In order to decompose this residue, protracted boiling with strong acid is necessary, this treatment entailing a loss of hydrocyanic acid, owing to decomposition.

According to my improved method of manufacture ferrocyanid of calcium or the double salt of ferrocyanid of calcium and potassium is heated in conjunction with sulfuric acid of suitable strength, (between ten and thirty per cent.,) with the result that hydrocyanic acid is yielded and the formation of the insoluble double ferrocyanid avoided. A solution of caustic potash or of caustic soda is treated with the hydrocyanic acid so obtained, a solution of cyanid of potassium or of sodium resulting.

Where the conditions admit of the process being carried out locally—that is to say, where the cyanid solution is required for use in the treatment of auriferous and argentiferous ores or for other purposes—the solution last referred to is ready for use; but where such conditions do not prevail the solution may be evaporated and concentrated, as before described, and the cyanid of potassium or of sodium obtained in a solid state convenient for transport.

What I claim as my invention, and desire to secure by Letters Patent, is—

1. The herein-described process for the manufacture of hydrocyanic acid consisting in heating ferrocyanid of calcium in conjunction with sulfuric acid, substantially as set forth.

2. The herein-described process for the manufacture of hydrocyanic acid and of cyanid salts therefrom consisting in heating ferrocyanid of calcium in conjunction with sulfuric acid, producing hydrocyanic acid, and treating a solution of a caustic alkali with the acid so obtained, a solution of cyanid of the alkali employed resulting.

In testimony whereof I have signed my name to this specification in the presence of two subscribing witnesses.

JAMES HUGH PAUL.

Witnesses:
VIVIAN ELKINGTON,
H. E. WILLIAMS.